Oct. 16, 1962 A. J. TAVA ETAL 3,059,229
TEMPERATURE RESPONSIVE INDICATING SYSTEM
Filed Oct. 1, 1956 2 Sheets-Sheet 1
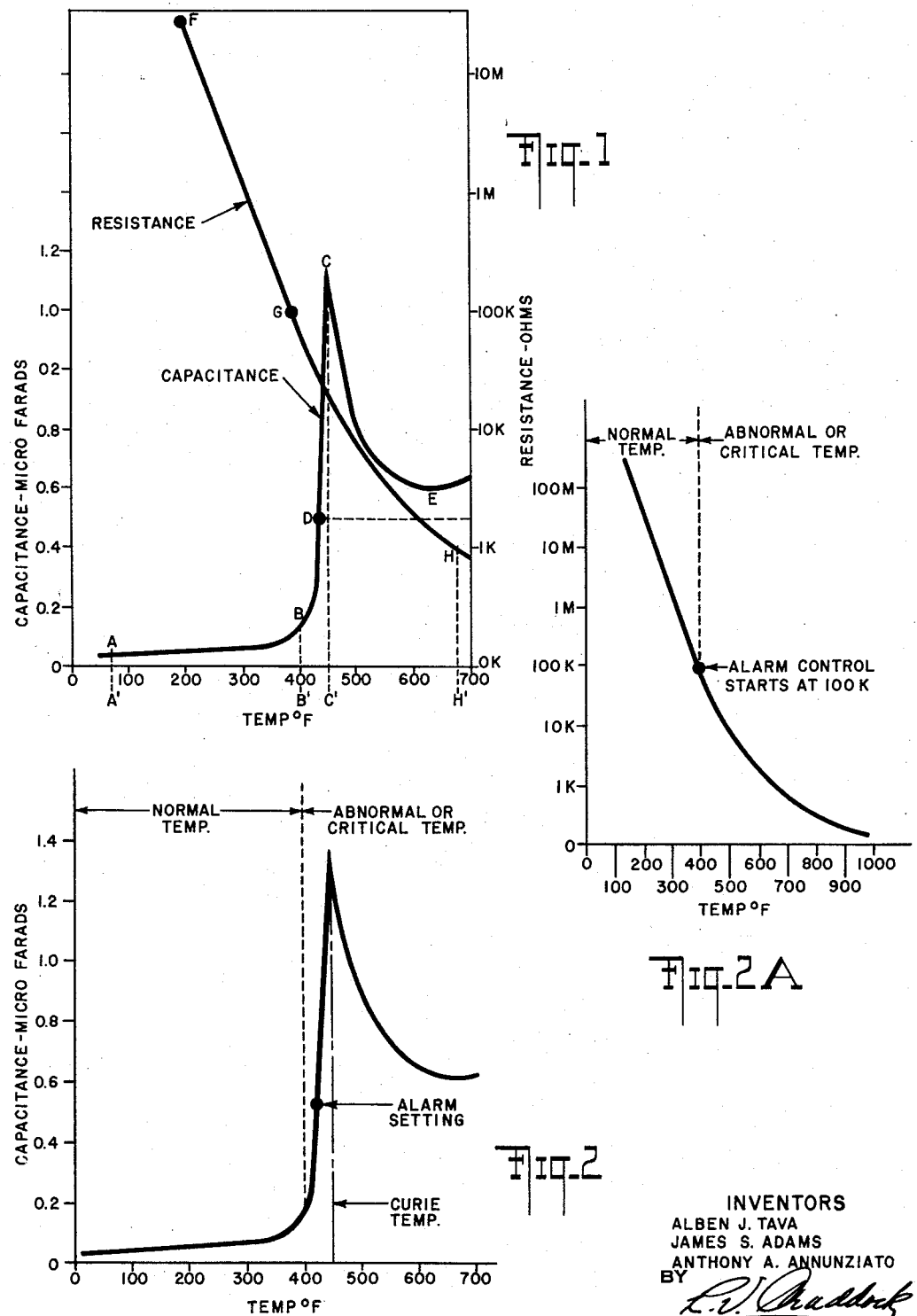
INVENTORS
ALBEN J. TAVA
JAMES S. ADAMS
ANTHONY A. ANNUNZIATO
BY
ATTORNEY

United States Patent Office 3,059,229
Patented Oct. 16, 1962

3,059,229
TEMPERATURE RESPONSIVE
INDICATING SYSTEM
Alben J. Tava, Hicksville, James S. Adams, Great Neck, and Anthony A. Annunziato, Ozone Park, N.Y., assignors to Sperry Rand Corporation, a corporation of Delaware
Filed Oct. 1, 1956, Ser. No. 613,136
5 Claims. (Cl. 340—227)

This invention relates to an electrical means for detecting and/or measuring temperature conditions and more particularly to a temperature responsive means and system for sensing one or more temperature conditions alternatively sequentially and/or simultaneously. The invention is especially adapted for use in aircraft temperature detection but is not necessarily limited thereto as it has wide application in other temperature detection and/or measuring environments.

Prior art temperature responsive systems have several inherent limitations. The sensitive element has had only one parameter which varies with temperature. The sensitive element could not be used to cover as wide a range of operating temperatures as the element of the present invention. Excessively low resistance values of the sensitive element have limited the operating range and there has been ambiguity of alarm signals.

It is an object therefore of the present invention to provide an electrical means for detecting and/or measuring one or more temperature conditions alternatively, sequentially and/or simultaneously.

It is another object of the present invention to provide a temperature responsive system operable over a wide range of temperature conditions.

It is a further object of the present invention to prevent ambiguous alarm signals.

Another object of the present invention is to minimize the effects of varying ambient conditions over the length of the sensing component.

A further object of the present invention is to provide a system which can use a longer sensing component over a wider temperature range.

A dielectric sensitive element for purposes of the description of the present invention is defined as a material in which the electric characteristics of capacitance and resistance are non-linear functions of temperature whereby the dielectric constant increases with rising temperature while the ohmic resistance decreases with rising temperature. Preferably, the capacitance characteristic is substantially constant over a relatively wide first temperature range and changes abruptly over a very limited second temperature range. The resistance characteristic, preferably, is relatively high over the first and second temperature ranges dropping to a relatively low but measurable value over a third temperature range. The above characteristics are found in several materials particularly those known as ferroelectrics and anti-ferroelectrics. For purposes of this description henceforth when the word ferroelectric is used, it is intended to include anti-ferroelectrics since the electrical characteristics which are utilized in the present invention are common to both ferroelectrics and anti-ferroelectrics. Preferably, but not necessarily, the dielectric sensitive element is in the form of a ceramic in order that it does not undergo irreversible changes which would cause the electrical properties thereof to be altered upon repeated exposures to the upper limit of its operating range. It is to be understood that the first, second and third temperature ranges mentioned above, are not necessarily in their respective order of increasing temperature.

For purposes of the description of the present invention the term "normal temperature" is the normal operating ambient temperature of the area and is below the abnormal temperature. The "abnormal temperature" is higher than the normal operating temperature of the area and is indicative of an overheat condition that lies above the normal temperature and below the critical temperature. The "critical temperature" is above the abnormal temperature of the area or is a flame temperature that is indicative of a fire condition in the area or at a particular point.

In particular, the invention resides in a system having a sensing component responsive to at least one temperature condition wherein the sensing component comprises a bendable cable formed of two electrodes with a dielectric sensitive element contiguous to said electrodes. When utilizing lead zirconate, for example, as the dielectric sensitive element, the capacitance characteristic may be utilized to indicate abnormal temperature conditions while the resistance characteristic may be utilized to indicate critical temperature conditions thus providing a two signal temperature responsive system. A one signal system may be provided by utilizing the resistance or capacitance parameter only. The temperature responsive cable associated with electrical circuitry forms a temperature responsive system in accordance with the objects of the invention. Various other objects, advantages and features of the present invention will become apparent from the following detailed description taken in conjunction with the accompanying drawings, wherein like reference characters indicate like elements, in which:

FIG. 1 shows typical curves of the resistance and capacitance characteristics versus temperature for a lead zirconate dielectric sensitive element twenty-five feet in length constructed in accordance with the present invention for a two signal system;

FIG. 2 is a typical curve of the capacitance versus temperature for a similar lead zirconate element constructed in accordance with the present invention for a one signal system;

FIG. 2A is a typical curve of the resistance versus temperature for a similar lead zirconate element constructed in accordance with the present invention for a one signal system;

Figure 3:
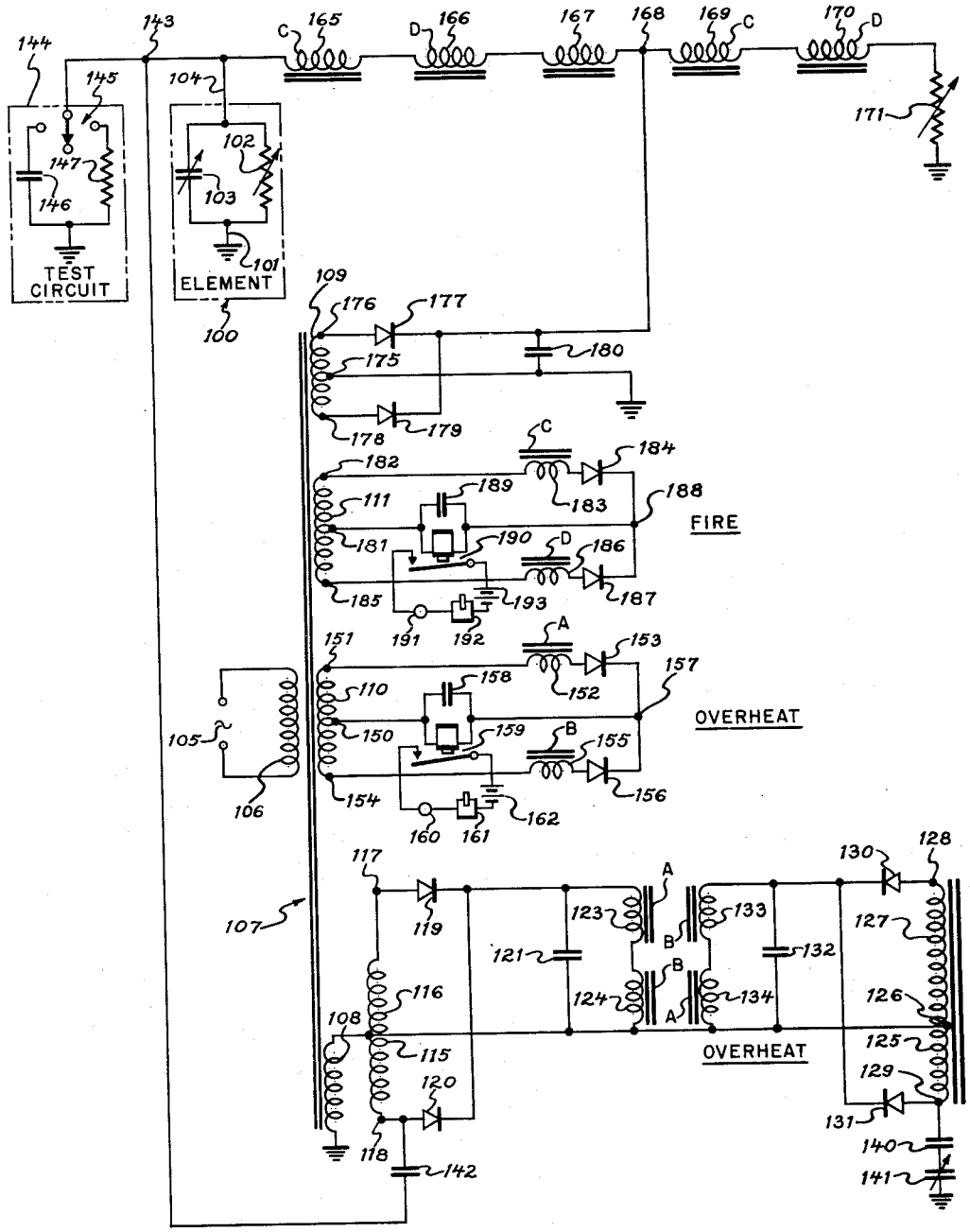
FIG. 3 is a schematic drawing of a novel electrical temperature responsive circuit utilizing the temperature detector cable disclosed in copending application Serial No. 613,197, entitled "Electric Temperature Detector," filed October 1, 1956, now U.S. Patent No. 2,949,594, issued August 16, 1960.

In accordance with the present invention, one of a number of dielectric sensitive element which have suitable electrical characteristics previously described are suitable for application in a temperature responsive system. The use of a particular dielectric sensitive element is determined by the Curie point of the dielectric sensitive compound and the temperature or the temperature range over which it is intended to be used. By way of a preferred illustration, the invention is particularly described with relation to lead zirconate as the dielectric sensitive element but it is to be understood that no unnecessary limitations of the present invention to this material is intended.

The following is a representative list of compounds which may be utilized as dielectric sensitive elements in temperature responsive systems that appear to be particularly suitable based on available data including Curie point information:

| Compound: | Curie Point, ° C. |
|---|---|
| Barium titanate | 130 |
| Lead hafnate | 215 |
| Lead zirconate | 231 |

| Compound: | Curie Point, °C. |
|---|---|
| Rubidium tantalate | 247 |
| Sodium niobate | 330 / 355 |
| Potassium niobate | 434 |
| Lithium tantalate | 450 |
| Sodium tantalate | 475 |
| Lead titanate | 490 |

The following is an additional list of compounds which appear to be suitable for lower temperature application based on available data including Curie point information:

| Compound: | Curie Point, °C. |
|---|---|
| Cadmium niobate $Cd_2Nb_2O_7$ | −88 / −103 |
| Potassium tantalate | −260 |

It is probable that the following compounds may also be suitable for temperature detection purposes because their crystallographic characteristics indicate they are ferroelectric although their specific electrical characteristics are not known at present:

| Compound: | Curie Point, °C. |
|---|---|
| Lithium niobate | ----- |
| Strontium hafnate | ----- |
| Barium hafnate | ----- |
| Tungsten oxide | ----- |
| Sodium vanadate | ----- |
| Lanthanum aluminate | ----- |
| Lead niobate | −258 |
| Strontium titanate | −273 |

Shifting of the Curie point temperature with a change in dielectric variations can be accomplished by mixtures of the materials. This may be accomplished by compounding together ceramic powders of two different ferroelectric materials or by compounding a non-ferroelectric material with a ferroelectric material. In the titanate group, for example, mixtures of barium and strontium titanate can be affected. In the zirconate group, solid solutions of lead and barium zirconate achieve analogous results. In the niobate group, mixtures of cadmium and sodium niobate give similar results. In such a manner, not only may the Curie temperature be shifted, but the manner in which the resistance and the dielectric constant vary with temperature may be altered. Two cases of temperature shifting may be cited: (a) The Curie temperature of lead zirconate may be shifted upwards in a uniform manner by the addition of lead titanate. In this way Curie temperatures of 231 to 490° C. may be obtained. (b) The Curie temperature of potassium niobate (435°) may be depressed approximately 7° C. for each mole percent of potassium tantalate added. Changes in the electrical characteristics of the dielectric sensitive elements may also be accomplished by mixtures of materials such as lead oxide being mixed with lead zirconate which will be more fully described later.

For use in an aircraft temperature responsive system, a dielectric sensitive element comprising lead zirconate is particularly advantageous since it has its Curie point at 231° C. (448° F.) which is the approximate abnormal temperature where overheat detection is desired with the cable of the sensing component becoming operative to give an alarm signal at approximately 425° F. which will now be described.

Referring now to FIG. 1 the capacitance and D.C. resistance characteristics versus temperature for a typical two signal system are plotted for a lead zirconate dielectric sensitive element having a length of twenty-five feet. Referring to the capacitance curve, the temperature zone from A' to B' is considered a normal temperature zone. In this temperature zone it is desirable that there be little or no change in capacitance characteristic with increasing temperature from A to B. By maintaining a substantially constant capacitance characteristic from A to B, variations of the normal or ambient temperature within the range A' to B' will not affect the capacitance signal. Therefore, the only parameter affecting the signal level of the normal temperature zone A' to B' is the length of the sensing dielectric sensitive element.

An abrupt change in the capacitance characteristic from B to C results in an abrupt change in capacitance signal level resulting from this characteristic. This abrupt change occurs over a narrow temperature band which may be referred to as an abnormal or overheat temperature range in a two signal system. This abrupt change in capacitance characteristic occurs over a fixed temperature from B' to C' and point C' is referred to as the Curie point which for lead zirconate is 448° F. (231° C.). The greater the change in the capacitance ratio from B to C, the sharper the curve becomes. The abrupt change in capacitance signal level is thus readily detectable. Since repeated heatings above the Curie point have no effect on changing the Curie point temperature, this point may be used as a positive reference temperature. It can be seen that a dielectric sensitive element having this characteristic is independent of normal temperature variations and signal response in a utilizing circuit where signal amplitude is a function of capacity, is dependent entirely on the sharp characteristic which occurs within a very limited temperature range.

Preferably, the alarm temperature is set on the rising slope of the capacitance characteristic curve for example point D to preclude any possibility of ambiguity or "drop-out" as a result of the lower capacitance characteristic at the higher temperatures such point E. Point E denotes the minimum drop from the Curie point which is within the temperature range above the abnormal range. Under certain conditions point C may be utilized as the alarm point or points may be selected on the capacitance curve on either side of the Curie point C for particular applications.

As described previously, additives to the dielectric sensitive element may vary the capacitance ratio and provide a marked improvement in the capacitive change over the range from B to C. For example, additions of lead oxide to lead zirconate improve the capacitance ratio by approximately 40% in certain cases to be described. This is advantageous as the greater the change from B to C, the easier it is to detect this change.

Reference is now made to the resistance characteristic curve of FIG. 1 for lead zirconate. When utilizing a two signal system, the second parameter to be used is generally the resistance characteristic of the dielectric sensitive element. It is to be understood however, that this is not mandatory and in certain systems the capacitance characteristic may be used to indicate the higher temperature range while the resistance characteristic is used to indicate a lower temperature range or they may be used individually to indicate either temperature range. Throughout the normal and abnormal temperature ranges A' to B' to C', the D.C. resistance characteristic F to G is of such magnitude that with the operating voltage used in the system there is no detectable D.C. signal change of the aforementioned temperature ranges. When the temperature continues above the abnormal temperature range B' to C' to a critical temperature range from C' to H', the resistance characteristic has a slope that permits conversion of resistance values to temperature. Thus by knowing the slope of the resistance characteristic curve, a signal level which is a function of resistance can be selected at any particular critical temperature. The resistance characteristic preferably is relatively high over the normal and abnormal temperature ranges and drops to a relatively low but measurable value over the critical temperature range. The primary advantage of the two parameter system is that one parameter such as capacitance can be used for one temperature range and alternatively, sequentially and/or simultaneously the other parameter such as resistance can be used for a different temperature range.

The resistance characteristic of the present invention is particularly useful because of its high resistance values which permits operating the sensing component at elevated ambient temperatures and still has sufficient resistance variations to detect even higher temperature exposures. Further, with this type of characteristic, longer lengths of the sensing component can be utilized with only slight reduction in the ambient range and no sacrifice in the detection of high temperature exposures. Thus, for example, a sensing component 15 feet long could be subjected to ambient temperatures up to 850° F. and still have sufficient variations in resistance to detect temperatures above 850° F. over a limited portion of the component. Assuming the same resistance values and doubling the length of the sensing component to 30 feet, the component could be subjected to ambient temperatures up to 800° F. and still have sufficient variations in resistance to detect temperatures above 800° F. as above, thereby providing a considerably longer length of sensing component operative over a considerably greater temperature range than previously known.

FIG. 2 is a characteristic curve of the capacitance versus temperature for lead zirconate using a sensing component 25 feet in length. This curve indicates how capacitance alone can be used as the sensing parameter such as in a single signal system. In this application, the desired normal temperature range is known and the abnormal or critical temperature range as the case may be is also known. On this basis, one of the materials listed above could be substituted for the lead zirconate to give the sharp characteristic change in the Curie point in the temperature zone where the alarm is desired thereby effectively increasing or decreasing the normal temperature range. For lead zirconate, the sharp change occurs only at the Curie point temperature at 448° and the resultant change in capacitance gives a positive alarm signal at, say, the alarm setting as shown. No other combination of temperatures can give this signal. This is not true of known prior art system where the alarm setting can be reached by exposing a short section of the sensing component to a high temperature or a long length of sensing component to a lower temperature thereby providing ambiguous alarm signals.

FIG. 2A is a resistance characteristic curve showing how resistance alone can be used as the sensing parameter such as in a one signal system. The curve is plotted on the basis of using a 25 foot sensing component of lead zirconate. Note that on a logarithmic scale, the resistance characteristic appears linear but in reality it is not linear. By selecting a material from the above group, a value of resistance may be obtained which is extremely high over the normal ambient temperature range and which decreases as the temperature range is approached where detection is desired. The control unit can be set at a predetermined value to detect the predetermined resistance of the dielectric sensitive element and when it drops to this value with increasing temperature an alarm will be given. For example, temperatures at any resistance level below 100K and preferably above 50 ohms can be used for alarm purposes. Thus, the dielectric sensitive element can be operated with the sensing component at 400° F., 600° F. or 800° F. and there is a still higher range over which to make an alarm adjustment.

In terms of the electrical resistance characteristics of the sensing component, it can be considered that the resistances of the dielectric sensitive elements are in parallel throughout the length of the sensing component. Therefore, as the length of the sensitive component is increased the total resistance thereof decreases but is still at such a high resistance level that longer lengths of sensing component can be operated at higher ambient temperatures than previously known.

FIG. 3 depicts a temperature responsive system utilizing the temperature detector cable described in the aforementioned patent application Serial No. 613,197, now U.S. Patent No. 2,949,594 which, for purposes of example, will be described using a dielectric sensitive element in the form of a ceramic of lead zirconate. The temperature detector cable or sensing component is indicated at 100 and comprises the conductive tube, dielectric sensitive element and conductive wire which is indicated schematically as lead 101, variable resistance 102 and variable capacitance 103, and lead 104 respectively. As previously explained the sensing component 100 includes a dielectric sensitive element, in this case lead zirconate which is responsive to abnormal and critical temperature conditions. For purposes of this description, the abnormal temperature condition will be referred to as overheat and the critical temperature condition will be referred to as fire. The temperature responsive system comprises an overheat circuit, a fire circuit, a sensing component and a test circuit. The system utilizes paired electrical components including paired magnetic amplifiers in each of the circuits, i.e., the overheat circuit and the fire circuit, providing balanced operation in each portion of the system which will now be described.

A suitable power supply 105, such as 115 volts 400 cycle, is applied to the primary winding 106 of transformer 107 which has secondary windings 108, 109, 110 and 111. Referring now to the overheat circuit, secondary winding 108 feeds a center-tapped autotransformer primary input winding 115 which connects to the other half of the coil, secondary winding 116. The autotransformer output terminals 117 and 118 connect to rectifiers 119 and 120 respectively. The output of the rectifier 120 connects to the output of rectifier 119 which in turn is connected to one side of capacitor 121. The other side of capacitor 121 is connected to the autotransformer center tap terminal 122. Two control windings 123 and 124 are connected in series and then connected across capacitor 121. Control winding 123 is wound on a high permeability ferromagnetic core of a magnetic amplifier indicated at A. Control winding 124 is wound on a separate but physically and magnetically identical ferromagnetic core of magnetic amplifier B.

Transformer secondary winding 108 also feeds autotransformer primary input winding 125. This autotransformer is physically and electrically identical to the previously described autotransformer. Center tapped terminals 126 and 122 of each autotransformer have a common connection. Autotransformer winding 125 connects to the other half of the coil, secondary winding 127. The autotransformer terminals 128 and 129 connect to rectifiers 130 and 131 respectively. The output of rectifier 131 is connected to the output of rectifier 130 which in turn is connected to one side of capacitor 132. The other side of capacitor 132 is connected to the autotransformer center tap terminal 126. Two bias windings 133 and 134 are connected in series and then connected across capacitor 132. Winding 134 is wound on the same core as winding 123. Winding 133 is wound on the same core as winding 124. Preferably the cores are supplied as matched pairs from the core manufacturer. All the windings preferably have the same number of turns and are wound with the same gage wire.

Terminal 129 connects to capacitor 140 which in turn is connected in series with capacitor 141, the other side of which is connected to ground. Preferably the capacitance of capacitor 141 is adjustable. Terminal 118 connects to one side of capacitor 142 which in turn is connected to terminal 143. The wire conductor or lead 104 of sensing component 100 also connects to terminal 143. The tube or lead 101 of the sensing component 100 is connected to ground. The dielectric sensitive element of the sensing component 100 is depicted by a variable resistor 102 and a variable capacitor 103 which is the electrical equivalent of the dielectric sensitive element of the preferred embodiment of the invention. It is to be understood that either the resistance characteristic, the capacitance characteristic or a combination of the two as indicated in the preferred embodiment shown in FIG. 3 may be utilized in a temperature responsive system.

The test circuit 144 includes a two pole momentary contact type switch 145, the selecting arm of which also connects to terminal 143. Capacitor 146 is connected to one pole thereof while resistor 147 is connected to the other pole. The other side of capacitor 146 and resistor 147 are connected to ground. If desired, the capacitance and resistance thereof may be adjustable.

Secondary winding 110 of the overheat circuit is center tapped at terminal 150. Output terminal 151 of secondary winding 110 is connected to magnetic amplifier power winding 152. The other side of winding 152 is connected to rectifier 153. The other output terminal 154 of secondary winding 110 is connected to magnetic amplifier power winding 155. The other side of winding 155 is connected to rectifier 156. The output of rectifiers 153 and 156 are connected to terminal 157. Terminal 157 connects to one side of capacitor 158. Terminal 150 connects to the other side of capacitor 158. Relay 159 is connected directly across capacitor 158. In series with the contact arm of relay 159 are suitable alarm devices such as lights 160 and annunciators 161 that are actuated by battery 162 when relay 159 is energized. Power winding 152 is wound on the same core of magnetic amplifier A as control winding 123 and bias winding 134. Power winding 155 is wound on the same core of magnetic amplifier B as control winding 124 and bias winding 133.

Referring now to the fire circuit of the system, terminal 143 is also connected to control winding 165 whose other side is connected to control winding 166 which in turn is connected to a high impedance choke 167. The other side of choke 167 is connected to terminal 168. Terminal 168 is connected to bias winding 169 which is connected to bias winding 170 which in turn is connected to resistor 171 that is connected to ground. Preferably, resistor 171 is adjustable to vary the resistance characteristic thereof. Control winding 165 is wound on a high permeability ferromagnetic core of magnetic amplifier C. Control winding 166 is wound on a separate but physically and magnetically identical ferromagnetic core of magnetic amplifier D. Control winding 165 and bias winding 169 are wound on the same core. Control winding 166 and bias winding 170 are wound on the same core, forming symmetrical magnetic amplifier units C and D as previously described for the overheat magnetic amplifier units A and B.

Secondary winding 109 is center tapped at terminal 175. Output terminal 176 of secondary winding 109 is connected to rectifier 177. The other output terminal 178 of secondary winding 109 is connected to rectifier 179. The output of rectifiers 177 and 179 are connected together to one side of condenser 180 and the same side is connected to terminal 168. Terminal 175 is connected to the other side of condenser 180 which is connected to ground.

Secondary winding 111 has a center tapped terminal 181. The output terminal 182 is connected to magnetic amplifier power winding 183. The other side of winding 183 is connected to rectifier 184. The other output terminal 185 is connected to magnetic amplifier power winding 186. The other side of winding 186 is connected to rectifier 187. The output of rectifiers 184 and 187 are connected to terminal 188. Terminal 188 connects to one side of capacitor 189. Terminal 181 connects to the other side of capacitor 189. Relay 190 is connected directly across capacitor 189. In series with the contact arm of relay 190 are suitable alarm devices such as lights 191 and annunciators 192 that are actuated by battery 193 when the relay 190 is energized. Power winding 183 is wound on the same core of magnetic amplifier C as control winding 165 and bias winding 169. Similarly power winding 186 is wound on the same core of magnetic amplifier D as control winding 166 and bias winding 170 to form symmetrical magnetic amplifiers.

Referring now to the operation of the overheat circuit, the secondary winding 108 of transformer 106 energizes the windings 115 and 125 of the center tapped autotransformer. The autotransformers form two symmetrically full wave rectified capacitor input filter circuits. The outputs of the full wave rectified capacitor input circuits are fed to control windings 123 and 124 and bias windings 133 and 134. The sense of the polarities on the above windings is such that control winding 123 opposes bias winding 134, and control winding 124 opposes bias winding 133. By properly splitting the wndings 123 and 134 and windings 124 and 133 between the control circuit and the bias circuit, equal D.C. resistances may be maintained in both circuits thereby minimizing errors in D.C. current levels in the aforesaid windings which could cause error signals to develop.

When the current in the control windings 123 and 124 exceeds the current in the bias windings 133 and 134 by a predetermined positive differential current, for example, 0.15 milliamp D.C. minimum, the power windings 152 and 155 in the overheat power circuit will saturate permitting full voltage output, for example 26 volts D.C., to appear across the overheat relay 159. The overheat realy 159 is then energized which closes the overheat alarm circuit through the contact arm and actuates the lights 160 and annunciators 161 or other suitable alarm devices.

When the D.C. current in the bias windings 133 and 134 exceeds the D.C. current in the control windings 123 and 124 by a negative differential current of a predetermined amount, for example, 0.15 milliamp D.C. maximum, the overheat power windings 152 and 155 will absorb or drop all of the voltage developed across the center tapped secondary winding 110. When this happens the voltage across the overheat relay 159 will be less than 1 volt D.C., for example, and this drop in voltage will cause the relay 159 to deenergize and interrupt any overheat alarm that had been given. The purpose of using a positive and negative dierential current to actuate an alarm and to de-actuate an alarm, respectively, is to achieve an effect of an on or off switching device and reduce the possibility of relay chattering.

One of the unique features of the above described symmetrical capacitor input type full wave filter circuit is that in series with each autotransformer winding is a high impedance device which limits the voltage across the autotransformer winding by acting as a voltage divider network. For the full wave circuit which supplies D.C. current to the control windings 123 and 124, the temperature sensing component 100 represented by a variable resistor 102 and a variable capacitor 103 represents the high impedance device. For the full wave circuit which supplies the D.C. current to the bias windings 133 and 134, the adjustable capacitor 141 is the high impedance device in series with the autotransformer.

Since both autotransformers derive their power from the same secondary winding 108, any line variations of voltage and frequency will effect the bias and control winding circuits in the same manner, and, since the differential current is the criterion for circuit operation, the undesirable effects caused by these variations are nullified. Also to be noted in the performance of the circuits is that rectifiers 119 and 120 and rectifiers 130 and 131 are in series with the full voltage of the autotransformers which is the same as the voltage across secondary winding 108. Because of this, the voltage drops across the diodes subtracts directly from the induced voltage across the autotransformers thereby reducing to a negligible degree the tendency for unequal rectifier forward drops from destroying the symmetry of the full wave capacitor input circuits supplying the D.C. current for the control and bias circuit operation.

The bias D.C. current to windings 133 and 134 may be preset by adjusting capacitor 141 to the value of capacitance which corresponds to the desired abnormal or overheat alarm condition. This alarm condition will occur when the impedance of the sensing component 100 equals or is less than the preset value of capacitor 141. As previously described, the characteristics of the sensing component 100 is predominately capacitive over the abnormal temperature range when using lead zirconate as the dielectric sensitive element. The range of adjustable capacitor 141 is a function of the total sensing component length and the percent of the component exposed to the abnormal temperature.

Condensers 140 and 142 are D.C. blocking capacitors which isolate the overheat circuit which is a rectified and filtered A.C. controlled system from the fire circuit which is a D.C. controlled system. The value for condensers 140 and 142 are equal to preserve the symmetry of both halves of the overheat circuit.

The operation of the fire circuit will now be described. Preferably the fire circuit is provided with a reference D.C. voltage of approximately 27 volts D.C. developed from a full wave capacitor input filter type circuit which is excited from power transformer secondary winding 109. The sense of the polarities of the control windings 165 and 166 and of windings 169 and 170 are such that control winding 165 opposes bias winding 169, and control winding 166 opposes bias winding 170. By properly splitting the windings 166 and 170 and windings 165 and 169 between the control circuit and the bias circuit equal D.C. resistance may be maintained in both circuits. This minimizes errors in the D.C. current levels in these windings which could cause error signals to develop. In this circuit, the impedance of this balanced resistance arrangement is only evident when operating the fire circuit at low values of resistance such as when the value of adjustable resistor 171 approximately equals the D.C. resistance of choke 167. The purpose of choke 167 is to isolate the A.C. overheat circuit from the D.C. fire circuit.

When the current in the control windings 165 and 166 exceeds the current in the bias windings 169 and 170 by a positive differential current, such as 0.15 miliamp D.C. maximum, the power windings 183 and 186 in the fire power circuit will saturate permitting full output voltage of approximately 26 volts D.C., for example, to appear across the fire relay 190. The fire relay is then actuated which closes the fire circuit indicating visual and/or oral fire alarm by means of lights 191 and/or annunciator 192 respectively. When the D.C. current from the bias windings 169 and 170 exceeds the D.C. current in the control windings 165 and 166 by a negative differential circuit, such as 0.15 milliamp D.C. maximum, then the fire power windings 183 and 186 will absorb or drop all the voltage developed by the center tapped secondary winding 111. The voltage across the fire relay 190 will then be less than 1 volt D.C. for example which will cause the relay to be deenergized and discontinue the alarm signal. The same advantages are obtained here as previously described when using positive and negative differential current to give and stop an alarm respectively.

One of the features of this circuit configuration is that in series with the control windings 165 and 166 is the normally high D.C. resistance of the sensing component 100 which permits the D.C. current to flow through the control windings 165 and 166.

The D.C. current in the bias windings 169 and 170 is preset by adjust resistor 171 to the proper value of resistance which corresponds to the desired fire alarm condition. This alarm condition will occur when the resistance of the sensing component 100 equals or is less than the preset value of adjustable resistor 171. Characteristics of the sensing component 100 are predominantly resistive in the critical or fire temperature range when using lead zirconate as the dielectric element as previously explained. The range of resistor 171 is a function of the minimum length of the sensing component 100 which must be exposed to the predetermined alarm temperature conditions.

In order to test the overheat fire alarm system circuitry a test circuit 144 may be utilized. The test circuit 144 consists of capacitor 146 and resistor 147 which acts to shunt the sensing component 100. When the overheat circuit is tested, capacitor 146 shunts the sensing component 100. The value of capacitor 146 is selected such that the total capacitance of the sensing component 100 and capacitor 146 lowers the impedance sufficiently to permit control current to flow and overcome the bias current which has been preset by capacitor 141 thereby activating the overheat alarm relay 159. The value of the test capacitor 146 is selected such that the entire length of the sensing component 100 which has originally been designated for the circuit must be in the circuit to properly activate the overheat alarm circuit. If a portion of the sensing component 100 is missing, the smaller capacitance due to the shorter length of component 100 added to the test capacitor 146 will not be sufficient to reduce the impedance of the combination of component 100 and capacitor 146 to give sufficient current to activate the overheat alarm circuit. Therefore, this arrangement tests both the magnetic amplifier portion of the circuit and also tests the installation of the sensing component 100.

When the fire circuit is tested, resistor 147 shunts the sensing component 100. The shunting resistor 147 reduces the total effective D.C. resistance of the sensing component 100 and causes control current to overcome the bias current which has been preset by adjusting resistor 171. The result is to activate the fire relay 190 and actuate the fire alarm devices thereby checking on the magnetic amplifier and relay portion of the fire circuit.

Thus a system has been described capable of responding to one or more temperature conditions which may be used to provide advance warning of abnormal temperature conditions and subsequently a fire warning. The present system automatically recycles and/or resets itself for subsequent use when the danger condition is past. It also performs reliably and it is not damaged by recycling to temperatures of 2000° F. The system alarms accurately to a specified preset temperature regardless of line voltage or frequency variations. The alarm temperature settings may be changed to meet new operating conditions without changing the cable or the circuits of the system. The present invention may also utilize longer lengths of sensing component over a wider temperature range than prior systems. The sensing component, the amplifier, and the circuit may be accurately and conveniently tested at any time for sensitivity and performance by a simple switching action.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A temperature responsive system comprising a first voltage dividing means including a temperature responsive means for providing a first control signal in accordance with variations of capacitance and a second control signal in accordance with variations of resistance with temperature, a second voltage dividing means including capacitive reference means for providing a first predetermined bias signal, first comparison means responsive to the difference between said first control signal and said first bias signal for providing an actuating signal in accordance therewith, resistive reference means for providing a second predetermined bias signal, second comparison means responsive to the difference between said second control signal and said second bias signal for providing an actuating signal in accordance therewith, and alarm means responsive to said actuating signals for providing an alarm signal at one or more predetermined temperature conditions.

2. A system of the character described in claim 1 including means for supplying a suitable power source to each of the aforesaid means whereby said alarm signal is unaffected by fluctuations in said power source.

3. A system of the character described in claim 1, including testing means for providing a first test signal in accordance with a predetermined capacitance and a second test signal in accordance with a predetermined resistance whereby said temperature responsive means and said system may be simultaneously tested.

4. A temperature detection system comprising a readily bendable cable-like temperature responsive element of continuous length for use in the detection of abnormal and critical temperature conditions at any location along its length having a bendable tubing forming one electrode and a wire forming a second electrode centrally located therein extending throughout the length of said tube and a dielectric material disposed between and contiguous with said electrodes, said material having a dielectric constant which varies non-linearly with temperature wherein over a first temperature range the dielectric constant is relatively low and substantially constant becoming appreciably and abruptly higher at a limited second temperature range including said abnormal temperature, said material further having a negative temperature coefficient of resistivity that decreases rapidly with increasing temperature to a lower but measurable value over a third temperature range including said critical temperature, first electrical circuit means coupled to said element and responsive to the variations in said dielectric constant for indicating said abnormal temperature condition, second electrical circuit means coupled to said element and responsive to the variations in said coefficient of resistivity for indicating said critical temperature condition whereby both said abnormal and critical temperature conditions are determinable by means of a single element, capacitive reference means coupled to said first circuit means for providing a first predetermined capacitive bias signal, first comparison means responsive to said variations in the dielectric constant and said first capacitive bias signal for providing an alarm signal in accordance with a first predetermined difference therebetween at said abnormal temperature, resistive reference means coupled to second circuit means for providing a second predetermined resistive bias signal, and second comparison means responsive to the variations in resistivity and said second resistive bias signal for providing an alarm signal in accordance with a second predetermined difference therebetween at said critical temperature.

5. A temperature detection system comprising a readily bendable cable-like temperature responsive element of continuous length for use in the detection of abnormal and critical temperature conditions at any location along its length having a bendable tubing forming one electrode and a wire forming a second electrode centrally located therein extending throughout the length of said tube and a dielectric material disposed between and contiguous with said electrodes, said material having a dielectric constant which varies non-linearly with temperature wherein over a first temperature range the dielectric constant is relatively low and substantially constant becoming appreciably and abruptly higher at a limited second temperature range including said abnormal temperature, said material further having a negative temperature coefficient of resistivity that decreases rapidly with increasing temperature to a lower but measurable value over a third temperature range including said critical temperature, first electrical circuit means coupled to said element and responsive to the variations in said dielectric constant for indicating said abnormal temperature condition, second electrical circuit means coupled to said element and responsive to the variations in said coefficient of resistivity for indicating said critical temperature condition whereby both said abnormal and critical temperature conditions are determinable by means of a single element, first testing means coupled to said first circuit means for providing a first test signal in accordance with a predetermined capacitance, and second testing means coupled to said second circuit means for providing a second test signal in accordance with a predetermined resistance whereby said temperature responsive element and said system may be simultaneously tested.

References Cited in the file of this patent
UNITED STATES PATENTS

| | | |
|---|---|---|
| 2,294,756 | Inutsuka | Sept. 1, 1942 |
| 2,371,660 | Wainer | Mar. 20, 1945 |
| 2,407,750 | Smith | Sept. 17, 1946 |
| 2,586,252 | Peters | Feb. 19, 1952 |
| 2,594,921 | Hansard | Apr. 29, 1952 |
| 2,611,854 | McNairy | Sept. 23, 1952 |
| 2,648,823 | Kock et al. | Aug. 11, 1953 |
| 2,674,049 | James | Apr. 6, 1954 |
| 2,717,356 | Foster | Sept. 6, 1955 |
| 2,735,934 | Keizer et al. | Feb. 21, 1956 |
| 2,764,659 | Postal | Sept. 25, 1956 |
| 2,768,266 | Marsden | Oct. 23, 1956 |
| 2,784,355 | Van Suchtelen | Mar. 5, 1957 |
| 2,894,251 | Ruffle | July 7, 1959 |

FOREIGN PATENTS

| | | |
|---|---|---|
| 304,215 | Switzerland | Mar. 1, 1955 |

OTHER REFERENCES

"Ferroelectric Materials" (Popper), Journal of Institute of Electrical Engineers, August 1956, pages 450–457.